Jan. 29, 1963   D. R. BUTTERLY   3,075,303
EDUCATIONAL DEVICE
Filed Aug. 8, 1961

DANIEL R. BUTTERLY
INVENTOR

BY Ralph E. Bitner
ATTORNEY

United States Patent Office 3,075,303
Patented Jan. 29, 1963

3,075,303
EDUCATIONAL DEVICE
Daniel R. Butterly, 114 227th St., Jamaica 11, N.Y.
Filed Aug. 8, 1961, Ser. No. 130,018
7 Claims. (Cl. 35—35)

This invention relates to an educational device for instructing announcers, salesmen, and teachers regarding the proper time to be spent on an answer, an opinion, or an explanation. The invention has specific relationship to an electronic device which plays back portions of a program or a series of questions and then permits a subject to deliver an answer during a predetermined time interval.

Various devices have been designed and constructed for the purpose of helping a student to read faster, or to speak in a more precise delivery sequence. For the most part, these devices are mere mechanical indicating means and do not take into consideration the subject matter to be discussed and do not permit the pupil any leeway in composing his own answers or in choosing his own words to fit a situation. The present invention is a combination of an indicating device which shows the pupil the allotted time interval for his answer and also produces a subject for consideration or a question to be answered.

One of the objects of this invention is to provide an improved educational device for instructing pupils in the art of composing answers and delivering them within a predetermined time interval. The device avoids one or more of the disadvantages and limitations of prior art arrangements.

Another object of the invention is to instruct salesmen in answering questions regarding a product or a service.

Another object of the invention is to furnish a visual indication of the allotted time given for an answer and to denote the elapsed time during the interval.

Another object of the invention is to provide a meter reading having a linear scale which indicates a time directly proportional to a signal.

Another object of the invention is to provide a circuit which produces a zero current through an indicating device when the time interval has ended.

The invention comprises an educational device which includes a play back recording instrument for producing recorded speech, signals, and blank intervals. The output of the play back device is applied to an electric filter which separates the speech waves from the signals, and a limiter and current amplifier for converting the electric signals into a train of electric pulses. The pulses are applied to a storage capacitor to which is connected a leakage resistor for slowly discharging the capacitor after it has been charged by the pulse signals. An electron discharge device is coupled to the leakage resistor and includes a meter in its anode circuit which shows the allotted time for the pupil to give an answer.

One of the features of the invention includes the matching of two characteristic curves to produce a resultant characteristic which is linear with time.

Another feature of the invention is a bias circuit which produces a zero reading on the meter at the end of an allotted time interval.

For a better understanding of the present invention, together with other and further objects thereof, reference is made to the following description taken in connection with the accompanying drawings.

Figure 1:
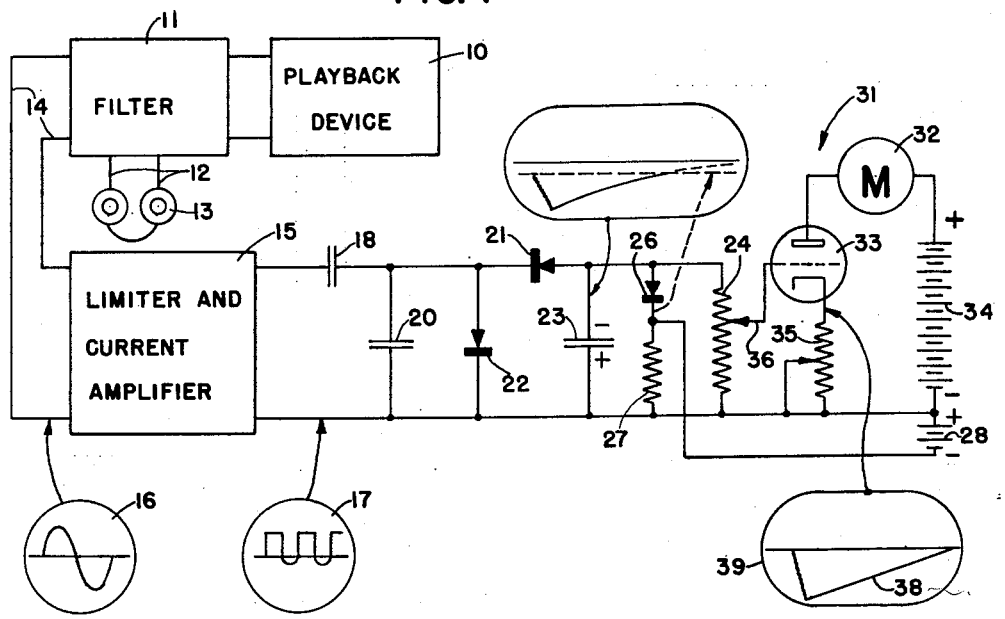
FIG. 1 is a schematic diagram of connections of the circuit showing some elements in block.

Referring now to FIG. 1, the device includes a play back arrangement 10 which first records a desired program on either a film, disk, or tape, and then, plays this program back and applies the electrical output to a filter circuit 11. The program recorded by the device 10 includes voice or music which may be in the form of a series of questions or a series of information bits which may require an answer. After each of these recordings, a low frequency signal is recorded which is generally a sine wave of 30 cycles per second. The low frequency signal may be introduced in the record by splicing. The length of this wave train is important since it denotes the time interval which follows and which is to be used by a pupil or an announcer to fill in an answer or other cooperating statement having a definite relation to the information produced prior to the signal. The answer time interval is a blank space on the recording media and is followed by another play back signal similar to the first and requiring another answer. It is to be understood that the term "answer" is used in this description to designate any reply or a continuing information portion which the pupil or announcer may consider necessary to supplement the information produced by the device 10.

The filter circuit 11 contains the usual filtering components and applies the play back signals to conductors 12 and a pair of ear phones 13 or other sound reproducing equipment which may be connected for reproduction purposes. The ear phones are generally worn by the pupil or announcer and a similar pair may be worn by an instructor or monitor who listens to the entire program. The filter circuit 11 eliminates the low frequency signal from conductors 12 and applies the signal waves to conductors 14 which are connected to a limiter and current amplifier circuit 15. The input wave applied over conductors 14 is illustrated in circle 16 and the output of the limiter circuit 15 is illustrated in circle 17. The limiter circuit may include zener diodes and vacuum tube amplifier components or any other circuit devices which will provide the transformation illustrated by wave shapes in circles 16 and 17.

The output of the limiter circuit 15 is first applied to a voltage divider circuit comprising capacitors 18 and 20 and is then applied to a rectifying circuit which includes diodes 21 and 22. The output of the rectifiers is applied to a storage capacitor 23 which is charged by the output pulses to a voltage which varies in magnitude with the number of pulses in the signal.

Figure 2:
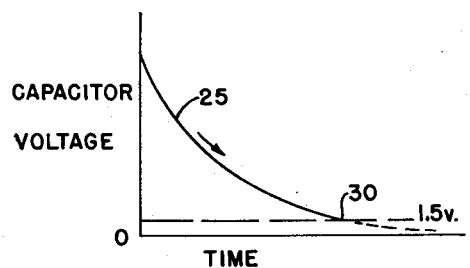
FIG. 2 is a graph indicating the characteristic discharge voltage with reference to time.

A leakage resistor 24 is connected across the terminals of capacitor 23 and provides a leakage path through which the capacitor slowly discharges. It is well-known that such a capacitor discharge proceeds in a logarithmic manner and such a discharge characteristic is illustrated in FIG. 2 where curve 25 has a constantly changing slope depending upon the capacitor voltage. Resistor 24 has a high value, of the order of one-half megohm so that the capacitor discharges slowly over an extended time interval.

In order to eliminate the low voltage trailing edge of the capacitor discharge and stop the discharge at a definite voltage, a bias circuit is connected around the capacitor terminals. This circuit includes a diode 26 and a resistor 27 shunted by a battery 28 which may be 1.5 volts. This bias circuit has no influence on the capacitor discharge and the capacitor voltages as long as the capacitor voltage is above the voltage of battery 28. During this condition, current from the capacitor cannot pass through diode 26. However, when the voltage of the capacitor 23 is reduced to the voltage of battery 28, any further discharge of the capacitor will be supplemented by the voltage from source 28, maintaining the capacitor voltage at this level. Because of this bias circuit, the storage capacitor 23 discharges to 1.5 volts and then stops abruptly. This point is indicated by reference character 30 on line 25 in FIG. 2.

An amplifier circuit 31 is coupled to discharge resistor 24 and converts the voltage across this resistor to a current which may be indicated by a meter 32. The amplifier circuit 31 may include any type amplifying device such as a transistor. However, in FIG. 1 an electron discharge device 33 is indicated having its anode-cathode circuit connected in series with the meter 32, a source of anode potential 34, and a bias resistor 35. The control electrode of the discharge device 33 is preferably connected to an adjustable contact 36 so that a reduced voltage may be obtained from the discharge resistor 24.

Figure 3:
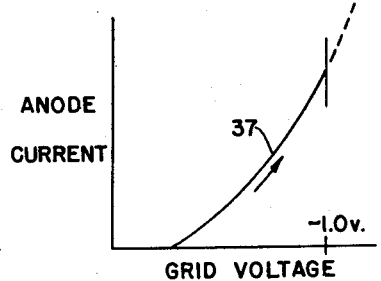
FIG. 3 is a graph showing the variation of the anode current in an electron discharge device as the grid voltage is varied.

It is well-known that the anode current characteristic changes its slope as the current is increased, such a characteristic being shown in FIG. 3 designated by reference character 37. This variable slope characteristic is employed to compensate for the variable slope characteristic of the capacitor discharge shown in FIG. 2. By suitable adjustments and the selection of the right type of vacuum tube, the combination of the two characteristics can be made to produce a result which is linear with time. This type of curve is indicated by the straight line 38 shown in circle 39.

The operation of this device is as follows: The play back device 10 is started and reproduces a question which a pupil or an announcer is required to answer within a predetermined time interval. The question is applied to conductors 12 and is heard by the pupil who wears head phones 13. Immediately after the end of the question a signal is applied to conductors 14. This signal consists of a predetermined train of sine waves, the number depending upon the time allotted for the answer. Circuit 15 transforms these waves into a train of pulses which charge capacitor 23 in a cumulative manner, that is; the resultant voltage on the capacitor is a function of the predetermined time allotted for the answer. The duration of the signal is generally less than one-half second and the capacitor 23 starts to discharge immediately thereafter.

As soon as the capacitor is charged, discharge device 33 conducts and a current is produced which passes through meter 32. As indicated by curve 38, the meter 32 shows a reading at the start of the answer time and then gradually moves toward the zero point which indicates the end of the answer period. The pupil or announcer starts his answer or announcement as soon as the meter indicates its maximum deflection and, while observing the motion of the indicating device, the pupil frames his answer so as to finish it just prior to the time when the indicating device reaches zero. In this manner the pupil is informed of the allotted time and is kept informed during his answer of the remaining time available. The meter, of course, can be calibrated in seconds or minutes.

Figure 4:
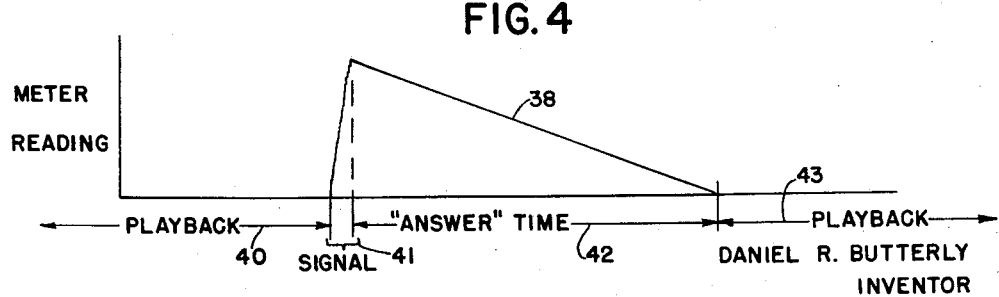
FIG. 4 is another graph showing the operation of the device and indicating the time intervals assigned to the play back time, signal time, and answer time.

The graph in FIG. 4 illustrates the operation just described. The first play back interval 40 contains the first question or statement. The signal interval 41 denotes the short time the train of pulses is applied to the circuit to charge the storage capacitor 23, and the answer time interval 42 denotes the allotted time for the answer to the first question. At the end of time 42, a second question time 43 begins and the cycle of question and answer is repeated. It should be noted that because of the bias circuit 26—27 the capacitor voltage stops abruptly at a predetermined bias voltage. Contact 36 is adjusted so that this bias voltage corresponds to the reading on the meter 32, marked "0," and because of this arrangement, the answer time is always concluded when the meter indicates "0."

The foregoing disclosure and drawings are merely illustrative of the principles of this invention and are not to be interpreted in a limiting sense. The only limitations are to be determined from the scope of the appended claims.

I claim:

1. An educational device comprising; a play back device which contains recorded speech, signal trains, and blank intervals; filtering means for separating the speech and signal trains; a rectifying circuit which receives said signals, rectifies them, and applies the resultant pulses to a storage capacitor to charge it to a voltage responsive to the length of the signal train; a resistor connected across said capacitor for providing a leakage path to discharge the capacitor during a predetermined time interval; an amplifier circuit coupled to said resistor for producing a current which varies in magnitude with the value of the capacitor voltage; and a meter coupled to said amplifier circuit for indicating said current.

2. An educational device comprising; a play back device which contains recorded speech, signal trains, and blank intervals; a filtering circuit which separates the speech and signal trains when the recorded information is reproduced; a limiter and current amplifier circuit which receives the signal train, rectifies and limits the signals, and applies the resultant pulses to a storage capacitor to charge it to a voltage which varies in accordance with the length of the signal train; a resistor connected across said capacitor for providing a leakage path to discharge the capacitor during a predetermined time interval; a voltage amplifier circuit coupled to said resistor for producing a current which varies in magnitude with the value of the capacitor voltage; and a meter coupled to the amplifier circuit for indicating the current.

3. An educational device comprising; a play back device which contains recorded speech, signal trains, and blank intervals; a filtering circuit connected to the play back device for separating the speech and signal trains when the recorded information is reproduced; a limiter and current amplifier circuit which receives the signal train, rectifies and limits the signals, and applies the resultant pulses to a storage capacitor to charge it to a voltage which varies in accordance with the length of the signal train; a leakage resistor connected across said capacitor for providing a leakage path to discharge the capacitor during a predetermined time interval; a bias circuit connected across said capacitor for restricting its discharge to a predetermined end voltage, said bias circuit including a rectifier and resistor in series and a source of potential connected across the resistor; a voltage amplifier circuit coupled to said leakage resistor for producing a current which varies in magnitude with the value of the capacitor voltage; and a meter coupled to the amplifier circuit for indicating the elapsed time.

4. A signal system for showing an alloted time interval comprising; terminals for connection to a source of electric pulses whose number represents a predetermined time interval, a rectifier circuit coupled to said terminals for passing the pulses to a chargeable circuit; a storage capacitor in said chargeable circuit for storing the charges carried by said pulses; a leakage resistor connected across said capacitor for providing a leakage path to discharge the capacitor during said predetermined time interval; a voltage amplifier circuit coupled to said leakage resistor for producing a current which varies in magnitude with the value of the capacitor voltage; and a meter coupled to the amplifier circuit for indicating elapsed time.

5. A signal system for showing an alloted time interval comprising; terminals for connection to a source of electric pulses whose number represents a predetermined time interval, a rectifier circuit coupled to said terminals for passing the pulses to a charging circuit; a storage capacitor in said charging circuit for accumulating the charges carried by said pulses; a leakage resistor connected across said capacitor for providing a leakage path to discharge the capacitor during said predetermined time interval; a bias circuit connected across said capacitor for restricting its discharge to a predetermined end voltage, said bias circuit including a rectifier and resistor in series and a source of potential connected across the resistor; a voltage amplifier circuit coupled to said leakage resistor for producing a current which varies in magnitude with the value of the capacitor voltage; and a meter coupled to the amplifier circuit for indicating the elapsed time.

6. A signal system as claimed in claim 5 wherein said amplifier circuit includes a three electrode vacuum tube with its grid-cathode circuit coupled to said leakage resistor and its anode-cathode circuit coupled to said meter.

7. A signal system as claimed in claim 6 wherein said vacuum tube operates with an anode-cathode internal impedance which varies as the grid voltage varies, said impedance adjusted to compensate for the varying rate of discharge of said capacitor and produce an anode-cathode current which varies in a linear manner with elapsed time.

References Cited in the file of this patent

UNITED STATES PATENTS

| | | |
|---|---|---|
| 2,892,040 | Johnson et al. | June 23, 1959 |
| 2,935,682 | Gates | May 3, 1960 |

FOREIGN PATENTS

| | | |
|---|---|---|
| 763,341 | Great Britain | Dec. 12, 1956 |